(12) United States Patent
Tsuzaka et al.

(10) Patent No.: US 10,611,922 B2
(45) Date of Patent: Apr. 7, 2020

(54) WATER-BASED INK SET FOR INK-JET RECORDING AND INK-JET RECORDING APPARATUS

(71) Applicant: Brother Kogyo Kabushiki Kaisha, Nagoya-shi, Aichi-ken (JP)

(72) Inventors: Yuka Tsuzaka, Nagoya (JP); Satoshi Okuda, Inazawa (JP); Mitsunori Maeda, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/104,577

(22) Filed: Aug. 17, 2018

(65) Prior Publication Data

US 2019/0100666 A1    Apr. 4, 2019

(30) Foreign Application Priority Data

Sep. 29, 2017   (JP) .................................. 2017-192144

(51) Int. Cl.

| | | |
|---|---|---|
| *C09D 11/40* | (2014.01) | |
| *C09D 11/328* | (2014.01) | |
| *B41M 5/00* | (2006.01) | |
| *C09D 11/037* | (2014.01) | |
| *C09D 11/033* | (2014.01) | |
| *B41J 2/21* | (2006.01) | |

(52) U.S. Cl.
CPC ............ *C09D 11/40* (2013.01); *B41M 5/0023* (2013.01); *C09D 11/033* (2013.01); *C09D 11/037* (2013.01); *C09D 11/328* (2013.01); *B41J 2/2107* (2013.01)

(58) Field of Classification Search
CPC ...... C09D 11/40; C09D 11/328; C09D 11/033; C09D 11/037; B41M 5/0023; B41J 2/2107
See application file for complete search history.

(56) References Cited

U.S. PATENT DOCUMENTS

| | | |
|---|---|---|
| 7,404,849 B2 | 7/2008 | Jackson et al. |
| 8,016,404 B2 | 9/2011 | Kato et al. |

(Continued)

FOREIGN PATENT DOCUMENTS

| | | |
|---|---|---|
| JP | 2004-331699 A | 11/2004 |
| JP | 2007-534802 A | 11/2007 |

(Continued)

*Primary Examiner* — Yaovi M Ameh
(74) *Attorney, Agent, or Firm* — Banner & Witcoff, Ltd.

(57) ABSTRACT

A water-based ink set for ink-jet recording includes: a water-based yellow ink containing water and a yellow dye having a blending amount in an entire amount of the water-based yellow ink of 2 to 3% by weight, the water-based yellow ink having a hue angle of 45° to 65°; a water-based magenta ink containing water and a magenta dye having a blending amount in an entire amount of the water-based magenta ink of 2 to 3% by weight, the water-based magenta ink having a hue angle of 340° to 360° or 0° to 5°; a water-based cyan ink containing water and a cyan dye having a blending amount in an entire amount of the water-based cyan ink of 2 to 3% by weight, the water-based cyan ink having a hue angle of 200° to 230°; and a water-based black ink containing water and a black dye having a blending amount in an entire amount of the water-based black ink of 6 to 7.5% by weight.

10 Claims, 2 Drawing Sheets

(56) References Cited

U.S. PATENT DOCUMENTS

| | | |
|---|---|---|
| 8,603,232 B2 | 12/2013 | Tsuzaka et al. |
| 9,579,884 B2 | 2/2017 | Matsumura et al. |
| 2004/0103818 A1 | 6/2004 | Kataoka et al. |
| 2005/0235867 A1 | 10/2005 | Jackson et al. |
| 2006/0048672 A1* | 3/2006 | Sugimoto .............. C09D 11/40 106/31.27 |
| 2008/0241398 A1 | 10/2008 | Kato et al. |
| 2012/0081453 A1* | 4/2012 | Tsuzaka .............. C09D 11/324 347/20 |
| 2015/0116392 A1* | 4/2015 | Ohishi .................. C09D 11/40 347/7 |
| 2015/0251410 A1 | 9/2015 | Matsumura et al. |

FOREIGN PATENT DOCUMENTS

| | | |
|---|---|---|
| JP | 2008-246821 A | 10/2008 |
| JP | 4253840 B2 | 4/2009 |
| JP | 2015-168088 A | 9/2015 |

* cited by examiner

WATER-BASED INK SET FOR INK-JET RECORDING AND INK-JET RECORDING APPARATUS

CROSS REFERENCE TO RELATED APPLICATION

The present application claims priority from Japanese Patent Application No. 2017-192144 filed on Sep. 29, 2017, the disclosure of which is incorporated herein by reference in its entirety.

BACKGROUND OF THE INVENTION

Field of the Invention

The present invention is related to a water-based ink set for ink-jet recording and an ink-jet recording apparatus.

Description of the Related Art

As water-based ink sets for ink-jet recording, there are suggested different kinds of water-based ink sets including four water-based dye inks of a water-based yellow ink that contains a yellow dye, a water-based magenta ink that contains a magenta dye, a water-based cyan ink that contains a cyan dye, and a water-based black ink that contains a black dye (see, for example, Japanese Patent Application Laid-open No. 2004-331699).

SUMMARY OF THE INVENTION

For example, when an achromatic image, such as a black image, is recorded on glossy paper by using the water-based ink set including the four water-based dye inks, a white streak-like uneven portion (banding) may appear in the recorded image. Further, when the achromatic image is recorded on glossy paper by use of the water-based ink set, it is required that granularity is prevented or reduced, that the water-based dye inks for the water-based ink set have high optical density, and that no achromatic color tinged with chromatic colors is created.

In view of the above, an object of the present teaching is to provide a water-based ink set for ink-jet recording in which a white streak-like uneven portion (banding) and granularity are prevented or reduced, water-based inks for the water-based ink set have high optical density, and no achromatic color tinged with chromatic colors is created, when an achromatic image is recorded on glossy paper by use of the water-based ink set.

According to a first aspect of the present teaching, there is provided a water-based ink set for ink-jet recording including: a water-based yellow ink containing water and a yellow dye having a blending amount in an entire amount of the water-based yellow ink of 2 to 3% by weight, the water-based yellow ink having a hue angle of 45° to 65°; a water-based magenta ink containing water and a magenta dye having a blending amount in an entire amount of the water-based magenta ink of 2 to 3% by weight, the water-based magenta ink having a hue angle of 340° to 360° or 0° to 5°; a water-based cyan ink containing water and a cyan dye having a blending amount in an entire amount of the water-based cyan ink of 2 to 3% by weight, the water-based cyan ink having a hue angle of 200° to 230°; and a water-based black ink containing water and a black dye having a blending amount in an entire amount of the water-based black ink of 6 to 7.5% by weight.

According to a second aspect of the present teaching, there is provided an ink-jet recording apparatus, including: an ink-set accommodating section which accommodates the water-based ink set for ink-jet recording as defined in the first aspect of the present teaching; an ink-jet head configured to jet the water-based yellow ink, the water-based magenta ink, the water-based cyan ink and the water-based black ink for the water-based ink set; and a controller, wherein in a case of recording using an achromatic color, the controller is configured to: control the ink-jet head to jet the water-based yellow ink, the water-based magenta ink, and the water-based cyan ink in a case that all pixel values R, G, and B of the achromatic color in an RGB color space are equal to or more than a first predefined value, control the ink-jet head to jet the water-based yellow ink, the water-based magenta ink, the water-based cyan ink, and the water-based black ink in a case that all the pixel values R, G, and B of the achromatic color in the RGB color space are equal to or more than a second predefined value and less than the first predefined value, and control the ink-jet head to jet the water-based black ink in a case that all the pixel values R, G, and B of the achromatic color in the RGB color space are less than the second predefined value.

DESCRIPTION OF THE EMBODIMENTS

Figure 1:
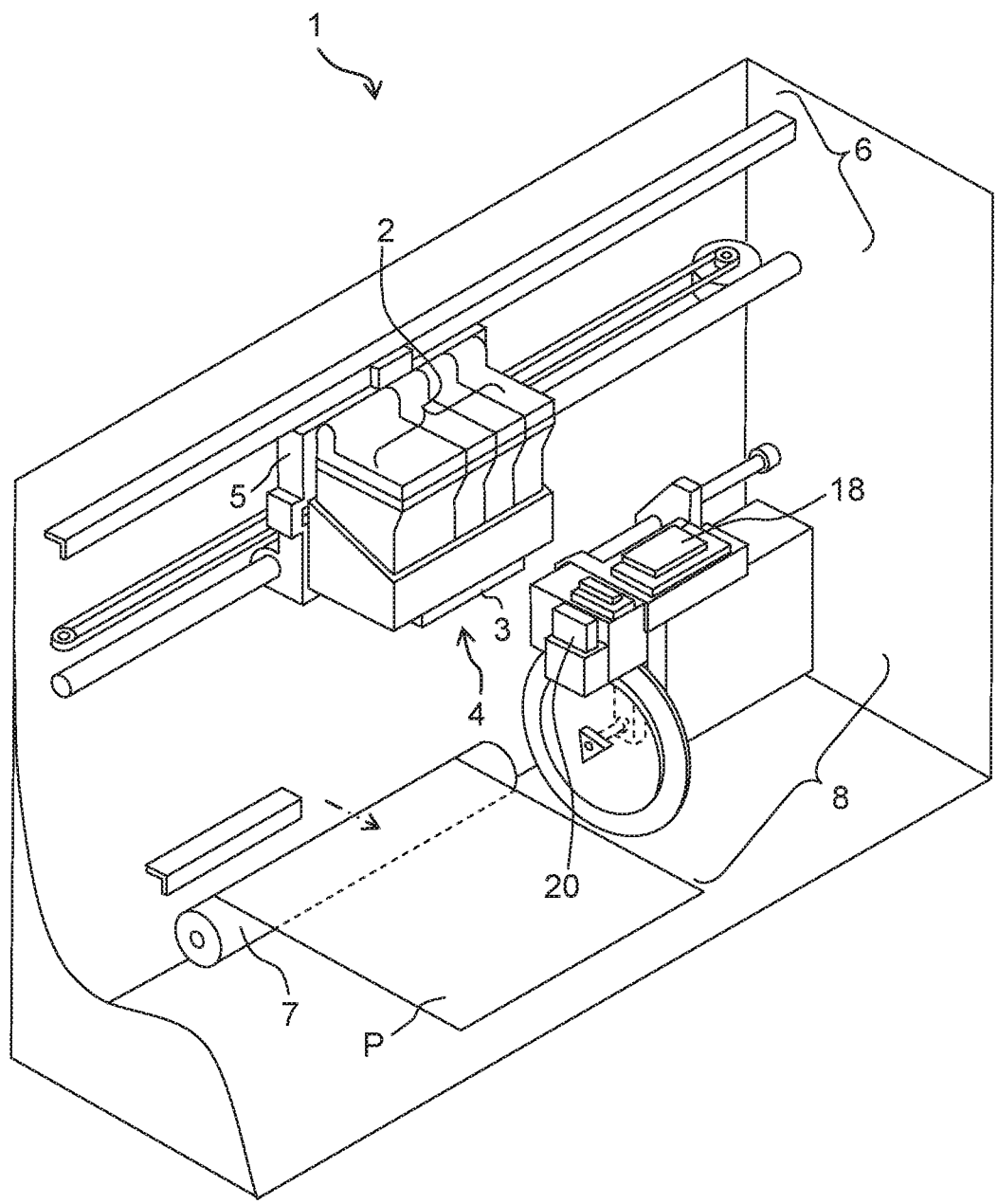
FIG. 1 is a schematic perspective view of an exemplary configuration of an ink-jet recording apparatus of the present teaching.

In the present teaching, a hue angle means, for example, an angle in accordance with an L*a*b* color system chromaticity diagram in which a* and b* are represented on a plane. The hue angle is defined as follows:

when satisfying a*≥0 and b*≥0 (the first quadrant), the hue angle is $\tan^{-1}(b*/a*)$;

when satisfying a*≤0 and b*≥0 (the second quadrant), the hue angle is $180° + \tan^{-1}(b*/a*)$;

when satisfying a*≥0 and b*≤0 (the third quadrant), the hue angle is $180° + \tan^{-1}(b*/a*)$; and when satisfying a*≥0 and b*≤0 (the fourth quadrant), the hue angle is $360° + \tan^{-1}(b*/a*)$.

In the present teaching, the hue angles of a water-based yellow ink, a water-based magenta ink, and a water-based cyan ink are determined by a method described in Examples described below.

In the present teaching, an achromatic color means, for example, an achromatic color except for white, and may be black or gray.

In the present teaching, glossy paper means, for example, recording paper in which at least one coating layer is formed on its recording surface. The coating layer(s) is/are made using silica particles, alumina particles, or the like. Examples of the glossy paper include photo glossy paper BP61G and BP71G manufactured by BROTHER KOGYO KABUSHIKI KAISHA; ink-jet paper Kassai Photo-finish Pro manufactured by FUJI FILM CORPORATION; and highest grade glossy paper PWRA4-20 manufactured by KODAK JAPAN LTD.

A water-based ink set for ink-jet recording according to the present teaching (hereinafter referred to as a water-based ink set or an ink set in some cases) is explained. The water-based ink set according to the present teaching includes the water-based yellow ink, the water-based magenta ink, the water-based cyan ink, and a water-based black ink.

<Water-Based Yellow Ink>

At first, the water-based yellow ink is explained. The water-based yellow ink contains a yellow dye and water. The hue angle of the water-based yellow ink is in a range of 45° to 65°. The water-based yellow ink is characterized in that the blending amount of the yellow dye in the entire amount of the water-based yellow ink is in a range of 2 to 3% by weight, and any other composition of the water-based yellow ink is not restricted at all.

The yellow dye is not particularly limited, which is exemplified, for example, by C.I. Direct Yellows 12, 23, 24, 26, 86, 98, 132, 142, and 173; and C.I. Acid Yellows 11, 17, 23, 25, 29, 42, 61, and 71. From among the above, the C.I. Direct Yellows 86 and 132 are preferably used. Only one kind of the yellow dye as described above may be used singly, or two or more kinds of the yellow dyes may be used in combination. The yellow dye may be made only using the C.I. Direct Yellows 86 and 132. The water-based yellow ink may not contain any other colorant than the C.I. Direct Yellows 86 and 132.

The water-based yellow ink may contain, for example, the C.I. Direct Yellows 86 and 132 as the yellow dye. In that case, a weight ratio between the blending amount ($Y_{86}$) of the C.I. Direct Yellow 86 and the blending amount ($Y_{132}$) of the C.I. Direct Yellow 132 in the entire amount of the water-based yellow ink satisfies, for example, $Y_{86}:Y_{132}=1:9$ to 5:5 or 1:4 to 3:2.

As described above, the blending amount of the yellow dye in the entire amount of the water-based yellow ink is in a range of 2 to 3% by weight.

The water is preferably ion-exchanged water or pure water (purified water). The blending amount of the water in the water-based yellow ink may be, for example, a balance of the other components.

The water-based yellow ink may further contain a water-soluble organic solvent. The water-soluble organic solvent is exemplified, for example, by a humectant that prevents the water-based yellow ink from drying at an end of a nozzle of an ink-jet head and a penetrant that adjusts drying velocity on the recording medium.

The humectant is not particularly limited, which is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, and trimethylolethane; 2-pyrrolidone, N-methyl-2-pyrrolidone; and 1,3-dimethyl-2-imidazolidinone. The polyalkylene glycol is exemplified, for example, by polyethylene glycol and polypropylene glycol. The alkylene glycol is exemplified, for example, by ethylene glycol, propylene glycol, butylene glycol, diethylene glycol, triethylene glycol, dipropylene glycol, tripropylene glycol, thiodiglycol, and hexylene glycol. Only one kind of the humectant as described above may be used singly, or two or more kinds of the humectants may be used in combination. Among the above, the polyvalent alcohol such as alkylene glycol and glycerol is preferably used.

The blending amount of the humectant in the entire amount of the water-based yellow ink is, for example, in a range of 0 to 95% by weight, in a range of 5 to 80% by weight, or in a range of 5 to 50% by weight.

The penetrant is exemplified, for example, by glycol ether. The glycol ether is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Only one kind of the penetrant as described above may be used singly, or two or more kinds of the penetrants may be used in combination.

The blending amount of the penetrant in the entire amount of the water-based yellow ink is, for example, in a range of 0 to 20% by weight, in a range of 0 to 15% by weight, or in a range of 1 to 4% by weight.

The water-based yellow ink may further contain a conventionally known additive, as necessary. The additive is exemplified, for example, by surfactants, pH-adjusting agents, viscosity-adjusting agents, surface tension-adjusting agents, and fungicides. The viscosity-adjusting agents are exemplified, for example, by polyvinyl alcohol, cellulose, and water-soluble resins.

The water-based yellow ink may be prepared, for example, by mixing the yellow dye, the water, and optionally other additive component(s) as necessary uniformly or homogeneously through any conventionally known method and then removing undissolved matters by a filter or the like.

As descried above, the hue angle of the water-based yellow ink is in a range of 45° to 65°. The hue angle of the water-based yellow ink can be adjusted, for example, by appropriately selecting the kind of the yellow dye, a mixture ratio, and the like.

<Water-Based Magenta Ink>

Subsequently, the water-based magenta ink is explained. The water-based magenta ink contains a magenta dye and water. The hue angle of the water-based magenta ink is in a range of 340° to 5°, namely, 340° to 360° or 0° to 5°. The water-based magenta ink is characterized in that the blending amount of the magenta dye in the entire amount of the water-based magenta ink is in a range of 2 to 3% by weight, and any other composition of the water-based magenta ink is not restricted at all.

The magenta dye is not particularly limited, which is exemplified, for example, by C.I. Direct Reds 1, 4, 17, 28, 83, and 227; C.I. Acid Reds 1, 6, 32, 37, 51, 52, 80, 85, 87, 92, 94, 115, 180, 256, 289, 315, and 317; and C.I. Basic Reds 1, 2, 9, 12, 13, 14, and 37. A dye represented by the following formula (1) may be used as the magenta dye. From among the above, the dye represented by the formula (1) and the C.I. Acid Red 289 are preferably used. Only one kind of the magenta dye as described above may be used singly, or two or more kinds of the magenta dyes may be used in combination. The magenta dye may be made only using the dye represented by the following formula (1), only using the C.I. Acid Red 289, or only using the dye represented by the following formula (1) and the C.I. Acid Red 289. The water-based magenta ink may not contain any other colorant than those dyes.

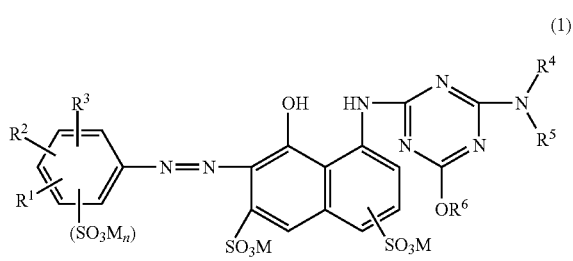

In the formula (1), n is 0, 1, or 2 each of $R^1$, $R^2$ and $R^3$ is a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, a sulfonic ester group, a substituted or non-substituted alkylsulfonyl group, a substituted or non-substituted arylsulfonyl group, a carboxy group, or a carboxylic ester group;

$R^1$, $R^2$ and $R^3$ may be identical to or different from each other;

each of $R^4$, $R^5$ and $R^6$ is a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, or a substituted or non-substituted heterocyclic group;

$R^4$, $R^5$ and $R^6$ may be identical to or different from each other;

when any one of $R^1$ to $R^6$ has an acid group, a part or all of the acid group(s) may be in a salt form, namely, when any one of $R^1$ to $R^6$ has at least one acid group, the at least one acid group is non-neutralized acid or salt thereof;

each of three Ms is H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, or $C_2H_4NH_2$; and the three Ms may be identical to or different from each other.

In the formula (1), the substituted or non-substituted alkyl group in $R^1$, $R^2$ and $R^3$ is preferably an alkyl group having 1 to 9 carbon atom(s) in total. The substituted or non-substituted alkyl group is exemplified, for example, by methyl group, ethyl group, n-propyl group, isopropyl group, n-butyl group, trifluoromethyl group, and dimethylaminomethyl group. The substituent of the substituted alkyl group is exemplified, for example, by hydroxyl group; alkoxy group such as methoxy group and ethoxy group; cyano group; halogen atom such as fluorine atom, chlorine atom, bromine atom, and iodine atom; and ionic hydrophilic group such as carboxylate and sulfonate.

In the formula (1), the substituted or non-substituted alkoxy group in $R^1$, $R^2$ and $R^3$ is preferably an alkoxy group having 1 to 9 carbon atom(s) in total. The substituted or non-substituted alkoxy group is exemplified, for example, by methoxy group, isopropoxy group, and n-butoxy group.

In the formula (1), the halogen atom in $R^1$, $R^2$ and $R^3$ is exemplified, for example, by fluorine atom, chlorine atom, bromine atom, and iodine atom.

In the formula (1), the substituted or non-substituted carbamoyl group in $R^1$, $R^2$ and $R^3$ is exemplified, for example, by carbamoyl group, N—N-dimethylcarbamoyl group, and phenylcarbamoyl group.

In the formula (1), the substituted or non-substituted sulfamoyl group in $R^1$, $R^2$ and $R^3$ is exemplified, for example, by sulfamoyl group, N-methylsulfamoyl group, N-ethylsulfamoyl group, N-ethyl-N-phenylsulfamoyl group, N,N-dimethylsulfamoyl group, and p-carboxyphenylsulfamoyl group.

In the formula (1), the substituted or non-substituted amino group in $R^1$, $R^2$ and $R^3$ is exemplified, for example, by N-methylamino group, carbamoylamino group, N,N-diethylamino group, and acetylamino group.

In the formula (1), the sulfonic acid ester group in $R^1$, $R^2$ and $R^3$ is exemplified, for example, by phenoxysulfonyl group.

In the formula (1), the substituted or non-substituted alkylsulfonyl group in $R^1$, $R^2$ and $R^3$ is preferably an alkylsulfonyl group having 1 to 9 carbon atom(s) in total. The substituted or non-substituted alkylsulfonyl group is exemplified, for example, by hydroxysulfonyl group.

In the formula (1), the substituted or non-substituted arylsulfonyl group in $R^1$, $R^2$ and $R^3$ is preferably an arylsulfonyl group having 6 to 15 carbon atoms in total. The substituted or non-substituted arylsulfonyl group is exemplified, for example, by benzylsulfonyl group.

In the formula (1), the carboxylic acid ester group in $R^1$, $R^2$ and $R^3$ is exemplified, for example, by methoxycarbonyl group.

In the formula (1), the substituted or non-substituted alkyl group in $R^4$, $R^5$ and $R^6$ is preferably an alkyl group having 1 to 18 carbon atom(s) in total. The substituted or non-substituted alkyl group is exemplified, for example, by ethyl group, n-butyl group, n-octyl group, ethylhexyl group, hydroxyethyl group, carboxypropyl group, carboxycyclohexylmethyl group, 1-carboxy-2-mercapto-ethyl group, 1-carboxy-2-carbamoyl-ethyl group, 1-isopropyl-1-carboxymethyl group, and 1,2-dicarboxypropyl group. The substituent of the substituted alkyl group is exemplified, for example, by hydroxyl group; alkoxy group such as methoxy group and ethoxy group; cyano group; halogen atom such as fluorine atom, chlorine atom, bromine atom, and iodine atom; and ionic hydrophilic group such as carboxylate and sulfonate.

In the formula (1), the substituted or non-substituted alkenyl group in $R^4$, $R^5$ and $R^6$ is preferably an alkenyl group having 2 to 18 carbon atoms in total. The substituted or non-substituted alkenyl group is exemplified, for example, by 2-methyl-1-propenyl group, vinyl group, and allyl group.

In the formula (1), the substituted or non-substituted aryl group in $R^4$, $R^5$ and $R^6$ is exemplified, for example, by 3,4-dicarboxyphenyl group, 4-butylphenyl group, and 4-carboxyphenyl group. The substituent of the substituted aryl group is exemplified, for example, by those same as the above-described exemplified substituents for the substituted alkyl group.

In the formula (1), the substituted or non-substituted aralkyl group in $R^4$, $R^5$ and $R^6$ is exemplified, for example, by benzyl group, 1-carboxy-2-phenyl-ethyl group, 1-carboxy-2-hydroxyphenylethyl group, and 4-carboxybenzyl group.

In the formula (1), the substituted or non-substituted alicyclic group in $R^4$, $R^5$ and $R^6$ is exemplified, for example, by cyclohexyl group and 4-carboxycyclohexyl group.

In the formula (1), the substituted or non-substituted heterocyclic group in $R^4$, $R^5$ and $R^6$ is exemplified, for example, by pyridyl group, thiadiazolyl group, benzothiazolyl group, and 2,2,6,6-tetramethylpiperidinyl group. The substituent of the substituted heterocyclic group is exemplified, for example, by those same as the above-described exemplified substituents for the substituted alkyl group.

In the formula (1), at least one of $R^4$, $R^5$ and $R^6$ may be an alkyl group, alkenyl group, aryl group, alicyclic group, aralkyl group or heterocyclic group which is substituted by one to four pieces of carboxy group(s) or sulfamoyl group(s).

In the formula (1), each of $R^4$ and $R^5$ may be a hydrogen atom or a tri-substituted phenyl group, and $R^4$ and $R^5$ may be identical to or different from each other. Here, each of three substituents of the tri-substituted phenyl group is a hydrogen atom, a halogen atom, a hydroxyl group, a substituted or non-substituted alkyl group having 1 to 9 carbon atom(s) in total, a substituted or non-substituted alkoxy group having 1 to 9 carbon atom(s) in total, a substituted or non-substituted carbamoyl group, a substituted or non-substituted sulfamoyl group, a substituted or non-substituted amino group, a nitro group, a sulfonic acid ester group, or a carboxylic acid ester group. The aforementioned three substituents may be identical to or different from each other.

A preferable aspect of the dye represented by the formula (1) is exemplified, for example, by an aspect wherein in the formula (1), at least one of $R^4$, $R^5$ and $R^6$ is an alkyl group, an alkenyl group, an aryl group, an aralkyl group, or a cyclohexyl group substituted by one to four pieces of carboxy group(s) or sulfamoyl group(s).

Regarding the dye represented by the formula (1), the number of sulfonic group, carboxy group, or the salt thereof contained in its structure is preferably six or less in total, more preferably five or less in total, and much more preferably four or less in total.

Another preferable aspect of the dye represented by the formula (1) is exemplified, for example, by an aspect wherein in the formula (1):
n is 0;
$R^1$ is a carboxy group, a carbamoyl group, a trifluoromethyl group, or a sulfamoyl group;
$R^2$, $R^3$ and $R^5$ each are a hydrogen atom;
$R^4$ is a phenyl group optionally substituted by a carboxy group or a sulfamoyl group, or a carboxy alkyl group;
$R^6$ is a hydrogen atom or an alkyl group;
when any one of $R^1$ to $R^6$ has an acid group, a part or all of the acid group(s) may be in a salt form;
each of three Ms is any one of H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$ and $C_2H_4NH_2$.

The dye represented by the formula (1) can be manufactured in accordance with known methods. For example, it can be manufactured by the method disclosed in U.S. Pat. No. 8,603,232.

Preferable specific examples of the dye represented by the formula (1) include compounds represented by the following formulae (1-1) to (1-5).

(1-1)

The compound represented by the formula (1-1) is an aspect wherein in the formula (1),
n is 0;
$R^1$ is a carboxy group at the 2-position of a phenyl group bonded to an azo group;
$R^2$, $R^3$ and $R^5$ each are a hydrogen atom;
$R^4$ is a 2-carboxyphenyl group;
$R^6$ is a hydrogen atom; and
M is $NH_4$.

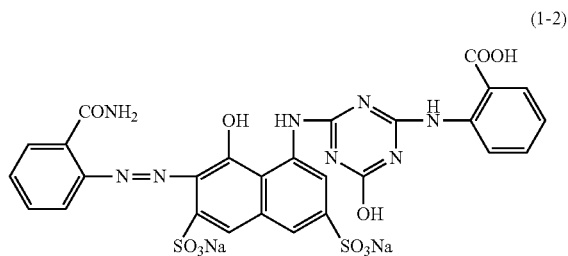

(1-2)

The compound represented by the formula (1-2) is an aspect wherein in the formula (1),
n is 0;
$R^1$ is a carbamoyl group at the 2-position of a phenyl group bonded to an azo group;
$R^2$, $R^3$ and $R^5$ each are a hydrogen atom;
$R^4$ is a 2-carboxyphenyl group;
$R^6$ is a hydrogen atom; and
M is Na.

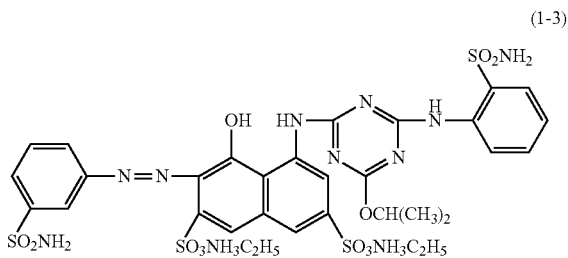

(1-3)

The compound represented by the formula (1-3) is an aspect wherein in the formula (1),
n is 0;
$R^1$ is a sulfamoyl group at the 3-position of a phenyl group bonded to an azo group;
$R^2$, $R^3$ and $R^5$ each are a hydrogen atom;
$R^4$ is a 2-sulfamoylphenyl group;
$R^6$ is an isopropyl group; and
M is $NH_3C_2H_5$.

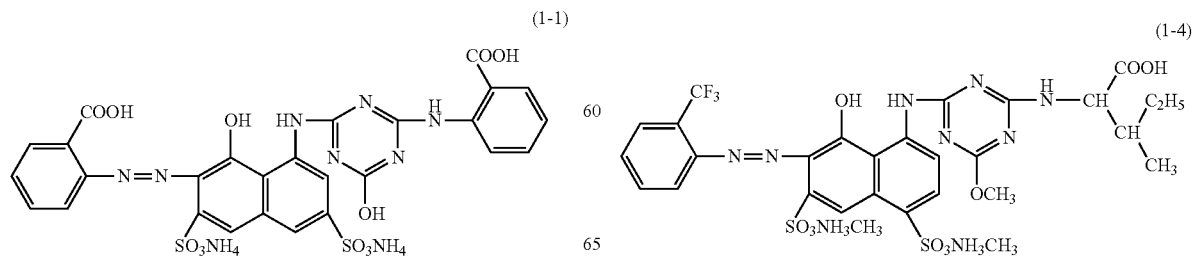

The compound represented by the formula (1-4) is an aspect wherein in the formula (1).

n is 0;
$R^1$ is a trifluoromethyl group at the 2-position of a phenyl group bonded to an azo group;
$R^2$, $R^3$ and $R^5$ each are a hydrogen atom;
$R^4$ is a 1-carboxy-2-methylbutyl group;
$R^6$ is a methyl group; and
M is $NH_3CH_3$.

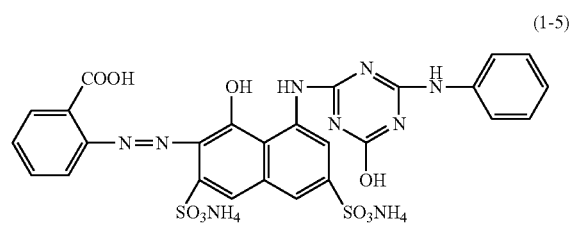

(1-5)

The compound represented by the formula (1-5) is an aspect wherein in the formula (1), n is 0;
$R^1$ is a carboxy group at the 2-position of a phenyl group bonded to an azo group;
$R^2$, $R^3$ and $R^5$ each are a hydrogen atom;
$R^4$ is a phenyl group;
$R^5$ is a hydrogen atom; and
M is $NH_4$.

As described above, the blending amount of the magenta dye in the entire amount of the water-based magenta ink is in a range of 2 to 3% by weight.

The water is preferably ion-exchanged water or pure water (purified water). The blending amount of the water in the water-based magenta ink may be, for example, a balance of the other components.

Similar to the water-based yellow ink, the water-based magenta ink may further contain a water-soluble organic solvent and an additive.

The water-based magenta ink may be prepared, for example, by mixing the magenta dye, the water, and optionally other additive component(s) as necessary uniformly or homogeneously through any conventionally known method and then removing undissolved matters by a filter or the like.

As descried above, the hue angle of the water-based magenta ink is in a range of 340° to 5°. The hue angle of the water-based magenta ink can be adjusted, for example, by appropriately selecting the kind of the magenta dye, a mixture ratio, and the like.

<Water-Based Cyan Ink>

Subsequently, the water-based cyan ink is explained. The water-based cyan ink contains a cyan dye and water. The hue angle of the water-based cyan ink is in a range of 200° to 230°. The water-based cyan ink is characterized in that the blending amount of the cyan dye in the entire amount of the water-based cyan ink is in a range of 2 to 3% by weight, and any other composition of the water-based cyan ink is not restricted at all.

The cyan dye is not particularly limited, which is exemplified, for example, by C.I. Direct Blues 6, 22, 25, 71, 86, 90, 106, and 199; C.I. Acid Blues 9, 22, 40, 59, 90, 93, 102, 104, 117, 120, 167, 229, and 234; and C.I. Basic Blues 1, 3, 5, 7, 9, 24, 25, 26, 28, and 29. From among the above, the C. I. Direct Blue 199 and 86 are preferably used. Only one kind of the cyan dye as described above may be used singly, or two or more kinds of the cyan dyes may be used in combination. The cyan dye may be made only using the C.I. Direct Blue 199, only using the C.I. Direct Blue 86, or only using the C.I. Direct Blue 199 and 86. The water-based cyan ink may not contain any other colorant than those dyes.

As described above, the blending amount of the cyan dye in the entire amount of the water-based cyan ink is in a range of 2 to 3% by weight.

The water is preferably ion-exchanged water or pure water (purified water). The blending amount of the water in the water-based cyan ink may be, for example, a balance of the other components.

Similar to the water-based yellow ink, the water-based cyan ink may further contain a water-soluble organic solvent and an additive.

The water-based cyan ink may be prepared, for example, by mixing the cyan dye, the water, and optionally other additive component(s) as necessary uniformly or homogeneously through any conventionally known method and then removing undissolved matters by a filter or the like.

As descried above, the hue angle of the water-based cyan ink is in a range of 200° to 2300. The hue angle of the water-based cyan ink can be adjusted, for example, by appropriately selecting the kind of the cyan dye, a mixture ratio, and the like.

<Water-Based Black Ink>

Subsequently, the water-based black ink is explained. The water-based black ink contains a black dye and water. The water-based black ink is characterized in that the blending amount of the black dye in the entire amount of the water-based black ink is in a range of 6 to 7.5% by weight, and any other composition of the water-based black ink is not restricted at all.

The black dye is not particularly limited, which is exemplified, for example, by C.I. Direct Blacks 17, 19, 32, 51, 71, 108, 146, 154, and 168; C.I. Acid Blacks 2, 7, 24, 26, 31, 52, 63, 112, and 118: C.I. Basic Black 2; and C.I. Food Blacks 1 and 2. Only one kind of the black dye as described above may be used singly, or two or more kinds of the black dyes may be used in combination.

As described above, the blending amount of the black dye in the entire amount of the water-based black ink is in a range of 6 to 7.5% by weight.

The water is preferably ion-exchanged water or pure water (purified water). The blending amount of the water in the water-based black ink may be, for example, a balance of the other components.

Similar to the water-based yellow ink, the water-based black ink may further contain a water-soluble organic solvent and an additive.

The water-based black ink may be prepared, for example, by mixing the black dye, the water, and optionally other additive component(s) as necessary uniformly or homogeneously through any conventionally known method and then removing undissolved matters by a filter or the like.

In the water-based ink set, a surface tension ($Y_{st}$) of the water-based yellow ink, a surface tension ($M_{st}$) of the water-based magenta ink, a surface tension ($C_{st}$) of the water-based cyan ink, and a surface tension ($K_{st}$) of the water-based black ink preferably satisfy $Y_{st}>C_{st}>M_{st}>K_{st}$. The surface tensions $Y_{st}$, $C_{st}$, $M_{st}$, and $K_{st}$ are preferably in a range of 25 mN/m to 38 mN/m. The difference between the surface tension $Y_{st}$ and the surface tension $C_{st}$, the difference between the surface tension $C_{st}$ and the surface tension $M_{st}$, and the difference between the surface tension Ms and the surface tension $K_{st}$ are preferably in a range of 0.2 mN/m to 4 mN/m. The surface tension is, for example, a value measured at a temperature of 25°.

In the water-based ink set, the water-based yellow ink, the water-based magenta ink, the water-based cyan ink, and the water-based black ink preferably contain the same water-soluble organic solvent, for example, the same humectant and/or the same penetrant. Making the above water-based inks contain the same water-soluble organic solvent allows the water-based inks to blend well with each other, facilitating the effect of the present teaching. The same humectant may preferably be glycerol, and the same penetrant may preferably be the triethylene glycol-n-butyl ether.

As described above, each of the water-based yellow ink, the water-based magenta ink, and the water-based cyan ink for the water-based ink set has the hue angle in the predefined range and the blending amount of the dye in the predefined range, and the water-based black ink for the water-based ink set has the blending amount of the dye in the predefined range. Thus, for example, when an achromatic image is recorded on glossy paper by using the water-based ink set, a white streak-like uneven portion (banding) and granularity are prevented or reduced, the water-based inks for the water-based ink set have high optical density, and no achromatic color tinged with chromatic colors is created. This mechanism is assumed, for example, as follows. Although the water-based ink set may be preferably used in recording on glossy paper, it may also be used, for example, in recording on any other recording medium than the glossy paper, such as regular paper.

Subsequently, an ink-jet recording apparatus of the present teaching will be described.

The ink-jet recording apparatus of the present teaching includes: an ink-set accommodating section; an ink jetting mechanism (ink-jet head); and a controller, wherein the water-based ink set for ink-jet recording of the present teaching is accommodated in the ink accommodating section; water-based inks for the water-based ink set are jetted from the ink jetting mechanism; and the controller controls the ink jetting mechanism to jet each of the water-based inks under the following conditions (1), (2), and (3) when recording using the achromatic color is performed.

Condition (1): When the condition for the achromatic color to be recorded is such that all pixel values R, G, and B in an RGB color space are equal to or higher than a first predefined value, the water-based yellow ink, the water-based magenta ink, and the water-based cyan ink are jetted;

Condition (2): When the condition for the achromatic color to be recorded is such that all the pixel values R, G, and B in the RGB color space are equal to or higher than a second predefined value and less than the first predefined value, the water-based yellow ink, the water-based magenta ink, the water-based cyan ink, and the water-based black ink are jetted.

Condition (3): When the condition for the achromatic color to be recorded is such that all the pixel values R, G, and B in the RGB color space are less than the second predefined value, the water-based black ink is jetted.

The respective pixel values of the RGB are represented, for example, by gradation values of 8 bits (0 to 255). For example, the pixel values R, G, and B of the black are RGB (0, 0, 0), and the pixel values R, G, and B of Japan Paint Manufactures Association No. N-30 are RGB (62, 65, 67).

The first predefined value is greater than the second predefined value. The first predefined value is, for example, in a range of 48 to 49, and the second predefined value is, for example, in a range of 0 to 1 or 1. In the condition (1), an upper limit value of each of the pixel values R, G, and B is, for example, less than 255.

The ink-jet recording apparatus of the present teaching includes: the ink-set accommodating section which accommodates the water-based ink set for ink-jet recording of the present teaching; the ink-jet head configured to jet the water-based inks for the water-based ink set; and the controller. In a case of recording using an achromatic color, the controller is configured to: control the ink-jet head to jet the water-based yellow ink, the water-based magenta ink, and the water-based cyan ink when all the pixel values R, G, and B of the achromatic color in an RGB color space are equal to or more than the first predefined value; control the ink-jet head to jet the water-based yellow ink, the water-based magenta ink, the water-based cyan ink, and the water-based black ink when all the pixel values R, G, and B of the achromatic color in the RGB color space are equal to or more than the second predefined value and less than the first predefined value; and control the ink-jet head to jet the water-based black ink when all the pixel values R, G, and B of the achromatic color in the RGB color space are less than the second predefined value.

FIG. 1 depicts an exemplary configuration of the ink-jet recording apparatus of the present teaching. As depicted in FIG. 1, an ink-jet recording apparatus 1 of the present teaching includes four ink cartridges 2, an ink jetting mechanism (ink-jet head) 3, a head unit 4, a carriage 5, a driving unit 6, a platen roller 7 and a purge device 8 as main constitutive components or parts. Although not depicted in FIG. 1, the ink-jet recording apparatus 1 includes the controller in an appropriate position.

Each of the four ink cartridges 2 contains the corresponding one of four water-based inks of yellow, magenta, cyan, and black. The water-based yellow ink, the water-based magenta ink, the water-based cyan ink, and the water-based black ink correspond to the water-based yellow ink, the water-based magenta ink, the water-based cyan ink, and the water-based black ink for the water-based ink set of the present teaching. Although this example uses a set with the four ink cartridges 2, instead of this, the present teaching may use an integrated type ink cartridge of which interior is comparted to form a water-based yellow ink accommodating section, a water-based magenta ink accommodating section, a water-based cyan ink accommodating section, and a water-based black ink accommodating section. As a body of the ink cartridge, for example, any conventionally known main body (body) of an ink cartridge can be used.

The ink-jet head 3 disposed on the head unit 4 performs recording on a recording medium P (e.g., recording paper such as glossy paper). The four ink cartridges 2 and the head unit 4 are provided or arranged on the carriage 5. The driving unit 6 causes the carriage 5 to reciprocate in a linear direction. As the driving unit 6, it is possible to use, for example, a conventionally known driving unit (see, for example, Japanese Patent Application laid-open No. 2008-246821 corresponding to United States Patent Application Publication No. US2008/0241398 A1). The platen roller 7 extends in the reciprocating direction of the carriage 5 and is arranged to face the ink-jet head 3.

The purge device 8 sucks or draws unsatisfactory ink (poor ink) which contains air bubbles, etc., accumulated or trapped in the inside of the ink-jet head 3. As the purge device 8, it is possible to use, for example, a conventionally known purge device (see, for example, Japanese Patent Application laid-open No. 2008-246821 corresponding to United States Patent Application Publication No. US2008/0241398 A1).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 1, in order to prevent the water-based inks from drying, a cap 18 covers a plurality of nozzles of the ink-jet head 3 which is returned to a reset position upon completion of the recording.

In the ink-jet recording apparatus 1 of this example, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes. Further, in these aspects, it is allowable to use four ink bottles having a bottle shape, instead of using the four ink cartridges 2. In such a case, each of the ink bottles is preferably provided with an inlet port via which the ink is poured from the outside to the inside of the ink bottle.

Ink-jet recording using the ink-jet recording apparatus 1 is performed, for example, in the following manner. Namely, at first, the recording paper P (e.g., glossy paper) is supplied or fed from a paper feeding cassette or sheet feeding cassette (not depicted in the drawing) arranged at a side of or at a position below the ink-jet recording apparatus 1. The recording paper P is introduced or guided between the ink-jet head 3 and the platen roller 7. Then, predefined recording is performed on the fed or introduced recording sheet P with the water-based ink(s) jetted from the ink-jet head 3. When recording using the achromatic color is performed, the controller controls the ink-jet head 3 to jet the water-based ink(s) under the above conditions (1), (2), and (3). When the condition for the achromatic color to be recorded is a pale achromatic color in which all the pixel values R, G, and B in the RGB color space are equal to or more than the first predefined value (the condition (1)), three water-based inks including the water-based yellow ink, the water-based magenta ink, and the water-based cyan ink are jetted; when the condition for the achromatic color to be recorded is an achromatic color with intermediate depth in which all the pixel values R, G, and B in the RGB color space are equal to or more than the second predefined value and less than the first predefined value (the condition (2)), four water-based inks including the water-based yellow ink, the water-based magenta ink, the water-based cyan ink, and the water-based black ink are jetted; and when the condition for the achromatic color to be recorded is a deep achromatic color in which all the pixel values R, G, and B in the RGB color space are less than the second predefined value (the condition (3)), only the water-based black ink is jetted. Accordingly, the white streak-like uneven portion (banding) and granularity are prevented or reduced, the water-based inks for the water-based ink set have high optical density, and no achromatic color tinged with chromatic colors is created, for example, when an achromatic image is recorded on glossy paper. The recording paper P after recording is discharged from the ink-jet recording apparatus 1. In FIG. 1, illustration of the feed mechanism and discharge mechanism for the recording paper P is omitted.

Figure 2:
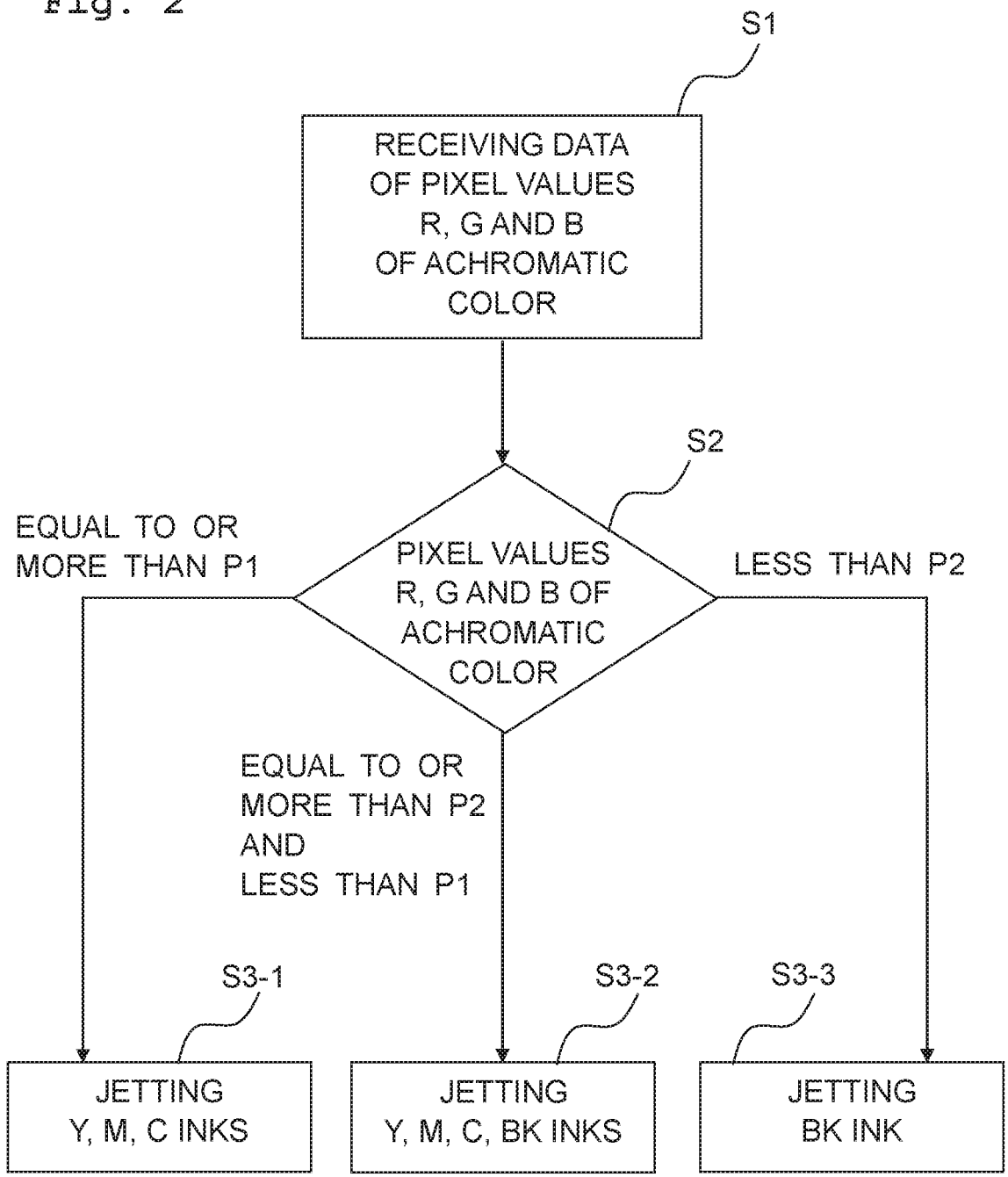
FIG. 2 is a flowchart of recording processing using an achromatic color.

Referring to the flowchart in FIG. 2, processing of recording an image including the achromatic color is further explained. At first, the controller receives a data of the pixel values R, G, and B of the achromatic color, for example, from an external device such as a computer when performing recording by use of the achromatic color (step S1). Next, the controller determines whether all the pixel values R, G, and B are equal to or more than the first predefined value (P1), whether all the pixel values R, G, and B are equal to or more than the second predefined value (P2) and less than the first predefined value (P1), or whether all the pixel values R, G, and B are less than the second predefined value (P2) (step S2). When all the pixel values R, G, and B are equal to or more than the first predefined value (P1), the controller controls the ink-jet head to jet the water-based yellow ink, the water-based magenta ink, and the water-based cyan ink, thus performing the recording by use of the achromatic color (step S3-1). In that case, the achromatic color includes the above three water-based inks, and does not include the water-based black ink. When all the pixel values R, G, and B are equal to or more than the second predefined value (P2) and less than the first predefined value (P1), the controller controls the ink-jet head to jet the water-based yellow ink, the water-based magenta ink, the water-based cyan ink, and the water-based black ink, thus performing the recording by use of the achromatic color (step S3-2). In that case, the achromatic color includes the above four water-based inks. When all the pixel values R, G, and B are less than the second predefined value (P2), the controller controls the ink-jet head to jet the water-based black ink, thus performing the recording by use of the achromatic color (step S3-3). In that case, the achromatic color includes the water-based black ink only.

In the apparatus depicted in FIG. 1, an ink-jet head of serial type (serial type ink-jet head) is adopted. The present teaching, however, is not limited to this. The ink-jet recording apparatus may be an apparatus adopting an ink-jet head of line type (line type ink-jet head).

The ink-jet recording method of the present teaching is an ink-jet recording method characterized by including: performing recording on a recording medium by jetting, to the recording medium, each water-based ink for a water-based ink set by an ink-jet system and using the water-based ink set for ink-jet recording of the present teaching, as the water-based ink set. The ink-jet recording method of the present teaching may include a control step of controlling, in a case of recording using the achromatic color, jetting of each of the water-based inks under the above conditions (1), (2), and (3).

Subsequently, a method of preventing or reducing the white streak-like uneven portion (banding) according to the present teaching is explained. The method of preventing or reducing the white streak-like uneven portion (banding) according to the present teaching is a method of preventing or reducing the white streak-like uneven portion (banding) in ink-jet recording using a water-based ink set, characterized in that the water-based ink set is the water-based ink set for ink-jet recording of the present teaching. The method of preventing or reducing the white streak-like uneven portion (banding) according to the present teaching may include a control step of controlling, in a case of recording using the achromatic color, jetting of each of the water-based inks for the water-based ink set under the above conditions (1), (2), and (3).

EXAMPLES

Next, Examples related to the present teaching will be explained together with Comparative Examples. Note that the present teaching is not limited by and is not restricted to the Examples and the Comparative Examples which will be described below.

<Preparation of Water-Based Ink>

Components which were included in Ink Composition (Tables 1 to 4) as indicated below were mixed uniformly or homogeneously; and thus a mixture was obtained. Subsequently, the obtained mixture was filtrated through a hydrophilic polytetrafluoroethylene (PTFE)-type membrane filter (pore size 0.20 μm) produced by Toyo Roshi Kaisha, Ltd., and thus each of water-based yellow inks Y1 to Y4 and Y1c to Y3c, water-based magenta inks M1 to M4 and M1c to M3c, water-based cyan inks C1 to C4 and C1c to C3c, and water-based black inks K1 to K3, K1c, and K2c as indicated in Tables 1 to 4 were obtained. In Tables 1 to 3, the hue angle of each of the water-based inks was found by the following method. In table 2, a dye (1-1) indicates the compound represented by the formula (1-1).

<The Method of Determining Hue Angle>

Measurement of color of each of the water-based inks was performed using a spectrophotometer UV 3600 manufactured by Shimadzu corporation to determine a L* value, a* value, and b* value. In the measurement, a measuring cell having a cell length of 10 mm was used and purified water was used as a reference. Those numerical values were determined based on the L*a*b* color system (CIE 1976 (L*a*b*) color system) normalized or standardized by Commission Internationale d'Eclairage (CIE) in 1976 (see, JIS Z 8729). The hue angle of each of the water-based inks was determined using the a* value and the b* value in accordance with the definition formula of the hue angle as described above.

Table 1 (following)—LEGEND

TABLE 1

|  |  | Y1 | Y2 | Y3 | Y4 | Y1c | Y2c | Y3c |
|---|---|---|---|---|---|---|---|---|
| Ink Composition | C.I. Direct Yellow 86 | 2.0 | 1.7 | 2.6 | 1.5 | — | 2.8 | — |
|  | C.I. Direct Yellow 132 | 0.5 | 0.3 | 0.4 | 1.0 | 1.5 | 0.7 | — |
|  | C.I. Direct Yellow 23 | — | — | — | — | — | — | 2.5 |
|  | Glycerol | 25 | 27 | 27 | 24 | 30 | 21 | 25 |
|  | Triethylene glycol-n-butyl ether | 2.5 | 2.5 | 2.5 | 2.5 | 2.5 | 2.5 | 2.5 |
|  | Sunnol (trade name) NL-1430 (*1) | 0.5 | 0.5 | 0.5 | 0.5 | 0.5 | 0.5 | 0.5 |
|  | Water | balance | balance | balance | balance | balance | balance | balance |
|  | Hue angle | 52° | 52° | 50° | 54° | 56° | 54° | 105° |

*1: Surfactant; produced by Lion Specialty Chemicals Co., Ltd.

The numeric value of the surfactant in the table indicates the active ingredient amount, and the unit of the ink composition is "% by weight".

Table 2 (following)—LEGEND

TABLE 2

|  |  | M1 | M2 | M3 | M4 | M1c | M2c | M3c |
|---|---|---|---|---|---|---|---|---|
| Ink composition | Dye (1-1) | 2.5 | — | 3.0 | 1.5 | 1.5 | — | — |
|  | C.I. Acid Red 289 | — | 2.0 | — | 1.0 | — | 3.5 | — |
|  | C.I. Acid Red 52 | — | — | — | — | — | — | 2.5 |
|  | Glycerol | 30 | 31 | 29 | 30 | 33 | 28 | 30 |
|  | Triethylene glycol-n-butyl ether | 2.5 | 2.5 | 2.5 | 2.5 | 2.5 | 2.5 | 2.5 |
|  | Sunnol (trade name) NL-1430 (*1) | 0.5 | 0.5 | 0.5 | 0.5 | 0.5 | 0.5 | 0.5 |
|  | Water | balance | balance | balance | balance | balance | balance | balance |
|  | Hue angle | 352° | 342° | 351° | 345° | 351° | 344° | 323° |

*1: Surfactant; produced by Lion Specialty Chemicals Co., Ltd.

The numeric value of the surfactant in the table indicates the active ingredient amount, and the unit of the ink composition is "% by weight".

Table 3 (following)—LEGEND

TABLE 3

|  |  | C1 | C2 | C3 | C4 | C1c | C2c | C3c |
|---|---|---|---|---|---|---|---|---|
| Ink composition | C.I. Direct Blue 199 | 2.5 | — | 3.0 | 1.5 | 1.5 | — | — |
|  | C.I. Direct Blue 86 | — | 2.0 | — | 1.0 | — | 3.5 | — |
|  | C.I. Acid Blue 90 | — | — | — | — | — | — | 2.5 |
|  | Glycerol | 30 | 31 | 29 | 30 | 33 | 28 | 30 |
|  | Triethylene glycol-n-butyl ether | 2.5 | 2.5 | 2.5 | 2.5 | 2.5 | 2.5 | 2.5 |

TABLE 3-continued

|  | C1 | C2 | C3 | C4 | C1c | C2c | C3c |
|---|---|---|---|---|---|---|---|
| Sunnol (trade name) NL-1430 (*1) | 0.5 | 0.5 | 0.5 | 0.5 | 0.5 | 0.5 | 0.5 |
| Water | balance | balance | balance | balance | balance | balance | balance |
| Hue angle | 222° | 219° | 225° | 220° | 222° | 218° | 267° |

*1: Surfactant; produced by Lion Specialty Chemicals Co., Ltd.

Table 4 (following)—LEGEND

TABLE 4

|  |  | K1 | K2 | K3 | K1c | K2c |
|---|---|---|---|---|---|---|
| Ink composition | C.I. Food Black 2 | 6.0 | 7.0 | 7.5 | 5.5 | 8.0 |
|  | Glycerol | 30 | 31 | 29 | 30 | 33 |
|  | Triethylene glycol-n-butyl ether | 2.5 | 2.5 | 2.5 | 2.5 | 2.5 |
|  | Sunnol (trade name) NL-1430 (*1) | 0.5 | 0.5 | 0.5 | 0.5 | 0.5 |
|  | Olfine (trade name) E1010 (*2) | 0.3 | 0.5 | 0.2 | 0.5 | 0.1 |
|  | Water | balance | balance | balance | balance | balance |

*1: Surfactant; produced by Lion Specialty Chemicals Co., Ltd.
*2: Surfactant; produced by Nissin Chemical Industry Co., Ltd.

The numeric values of the surfactants in the table indicate the active ingredient amounts, and the unit of the ink composition is "% by weight".

Examples 1 to 4 and Comparative Examples 1 to 5

<Composition of Water-Based Ink Set for Ink-Jet Recording>

As indicated in Table 5, the water-based ink set for ink-jet recording in each of Examples 1 to 4 and Comparative Examples 1 to 5 was obtained by combining the water-based yellow ink, the water-based magenta ink, the water-based cyan ink, and the water-based black ink.

<Evaluation for Water-Based Ink Set for Ink-Jet Recording>

For the water-based ink sets of Examples 1 to 4 and Comparative Examples 1 to 5, (a) evaluation for the white streak-like uneven portion (banding), (b) granularity evaluation, (c) evaluation for optical density (OD value), and (d) color difference (ΔE) evaluation were carried out by means of the following methods.

(a) Evaluation for the White Streak-Like Uneven Portion (Banding)

Ink cartridges for an ink-jet printer-equipped digital multifunction machine DCP-J552N produced by BROTHER KOGYO KABUSHIKI KAISHA were filled with the water-based yellow ink, the water-based magenta ink, the water-based cyan ink, and the water-based black ink for the water-based ink set of each of Examples 1 to 4 and Comparative Examples 1 to 5. Next, the ink cartridges were attached to the ink-jet printer-equipped digital multifunction machine DCP-J552N to record black solid images on glossy photo paper BP71G manufactured by BROTHER KOGYO KABUSHIKI KAISHA under the three conditions. The black solid images were visually observed, and evaluation was performed in accordance with the following evaluation criteria.

Condition (1): A black solid image with an RGB (50, 50, 50) was recorded by using the water-based yellow ink, the water-based magenta ink, and the water-based cyan ink;

Condition (2): A black solid image with an RGB (30, 30, 30) was recorded by using the water-based yellow ink, the water-based magenta ink, the water-based cyan ink, and the water-based black ink;

Condition (3): A black solid image with an RGB (0, 0, 0) was recorded by using the water-based black ink.

<Evaluation Criteria for Evaluation for the White Streak-Like Uneven Portion (Banding)>

AA: No white streak-like uneven portion (banding) was observed in all the black solid images recorded under the conditions (1) to (3);

A: Although the white streak-like uneven portion (banding) was not clearly observed in all of the black solid images recorded under the conditions (1) to (3), the white streak-like uneven portion(s) (banding) was/were slightly observed in any or all of the black solid images recorded under the conditions (1) to (3);

C: The white streak-like uneven portion(s) (banding) was/were clearly observed in any or all of the black solid images recorded under the conditions (1) to (3).

(b) Granularity Evaluation

Ink cartridges for the ink-jet printer-equipped digital multifunction machine DCP-J552N were filled with the water-based yellow ink, the water-based magenta ink, the water-based cyan ink, and the water-based black ink for the water-based ink set of each of Examples 1 to 4 and Comparative Examples 1 to 5. Next, the ink cartridges were attached to the ink-jet printer-equipped digital multifunction machine DCP-J552N to record gradation patterns on the glossy photo paper BP71G by using any of (i) the water-based yellow ink, the water-based magenta ink, and the water-based cyan ink, (ii) the water-based yellow ink, the water-based magenta ink, the water-based cyan ink, and the water-based black ink, and (iii) the water-based black ink from among the four water-based inks. Each of the gradation patterns recorded under the (i) to (iii) conditions had 256 gradations ranging from a solid image (100% duty) to an image with 0% duty (i.e., gradation patterns with 256 gradations from black to white). The gradation patterns recorded under the (i) to (iii) conditions were visually observed, and evaluation was performed in accordance with the following evaluation criteria <Evaluation Criteria for Granularity Evaluation>

AA: Dots were hardly observed in all the gradation patterns recorded under the (i) to (iii) conditions;

A: Although dots were not clearly observed in all of the gradation patterns recorded under the conditions (i) to (iii), dots were slightly observed in any or all of the gradation patterns recorded under the (i) to (iii) conditions;

C: Dots were clearly observed in any or all of the gradation patterns recorded under the conditions (i) to (iii).

(c) Optical Density (OD Value) Evaluation

Black solid images were recorded similarly to the black solid images recorded under the condition (3) in the (a) evaluation for the white streak-like uneven portion (banding), and optical densities (OD values) of three locations or portions in each of the black solid images were measured by using a spectrophotometric colorimetry meter SpectroEye (light source: $D_{50}$; field: 2°; ANSI-T) manufactured by X-Rite Inc. Then, an average value of the optical densities was found and evaluated in accordance with the following evaluation criteria.

<Evaluation Criteria for Optical Density (OD Value) Evaluation>

AA: The optical density (OD value) was equal to or more than 2.2;

A: The optical density (OD value) was equal to or more than 2.0 and less than 2.2;

C: The optical density (OD value) was less than 2.0.

(d) Color Difference (ΔE) Evaluation

Black solid images were recorded similarly to the (a) evaluation for the white streak-like uneven portion (banding), and a L* value, a* value, and b* value of three locations or portions in each of the black solid images were measured by using the spectrophotometric colorimetry meter SpectroEye (light source: $D_{50}$; field: 2°; ANSI-T). Then, an average value of those values was found, and a color difference (ΔE) was calculated in accordance with the following equation. The color difference (ΔE) was evaluated in accordance with the following evaluation criteria. Please note that the black solid image with small color difference (ΔE) means the achromatic color of the black solid image is not tinged with chromatic colors.

The Color Difference $(\Delta E)=(L^{*2}+a^{*2}+b^{*2})^{0.5}$

<Evaluation Criteria for Color Difference (ΔE) Evaluation>

AA: The color difference (ΔE) was less than 3.0 in all the black solid images recorded all the conditions (1) to (3);

A: The color difference (ΔE) was less than 5.0 in all of the black solid images recorded under the conditions (1) to (3), and the color difference (ΔE) was equal to or more than 3.0 in any or all of the black solid images recorded under the conditions (1) to (3);

C: The color difference (ΔE) was equal to or more than 5.0 in any or all of the black solid images recorded under the conditions (1) to (3).

The compositions and evaluation results for the water-based ink sets in Examples 1 to 4 and Comparative Examples 1 to 5 are indicated in Table 5.

As indicated in Table 5, each of Examples 1 to 4 had good results of all the evaluation for the white-streak like uneven portion (banding), granularity, optical density (OD value), and color difference (ΔE). Meanwhile, the water-based ink set of Comparative Example 1 in which the blending amount of the black dye in the entire amount of the water-based black ink was 5.5% by weight, had a bad result for the optical density (OD value) evaluation. The water-based ink set of Comparative Example 2 in which the blending amount of the black dye in the entire amount of the water-based black ink was 8.0% by weight, had a bad result for the evaluation for the white-streak like uneven portion (banding). The water-based ink set of Comparative Example 3 in which the blending amount of the yellow dye in the entire amount of the water-based yellow ink, the blending amount of the magenta dye in the entire amount of the water-based magenta ink, and the blending amount of the cyan dye in the entire amount of the water-based cyan ink were 1.5% by weight, had a bad result for the evaluation for the white-streak like uneven portion (banding). The water-based ink set of Comparative Example 4 in which the blending amount of the yellow dye in the entire amount of the water-based yellow ink, the blending amount of the magenta dye in the entire amount of the water-based magenta ink, and the blending amount of the cyan dye in the entire amount of the water-based cyan ink were 3.5% by weight, had a bad result for the granularity evaluation. The water-based ink set of Comparative Example 5 in which the hue angle of the water-based yellow ink was 105°, the hue angle of the water-based magenta ink was 323°, and the hue angle of the water-based cyan ink was 267°, had a bad result for the color difference (ΔE) evaluation.

As described above, for example, when the water-based ink set of the present teaching is used to record an achromatic image on glossy paper, the white streak-like uneven portion (banding) and granularity are prevented or reduced, the water-based inks for the water-based ink set have high optical density, and no achromatic color tinged with chromatic colors is created. The way of use of the water-based ink set of the present teaching is not particularly limited. The water-based ink set of the present teaching is widely applicable to various types of the ink-jet recording.

What is claimed is:

1. A water-based ink set for ink-jet recording, comprising:
a water-based yellow ink containing water and a yellow dye having a blending amount in an entire amount of the water-based yellow ink of 2 to 3% by weight, the water-based yellow ink having a hue angle of 45° to 65°;
a water-based magenta ink containing water and a magenta dye having a blending amount in an entire amount of the water-based magenta ink of 2 to 3% by

TABLE 5

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Water-based yellow ink | Y1 | Y2 | Y3 | Y4 | Y1 | Y1 | Y1c | Y2c | Y3c |
| Water-based magenta ink | M1 | M2 | M3 | M4 | M1 | M1 | M1c | M2c | M3c |
| Water-based cyan ink | C1 | C2 | C3 | C4 | C1 | C1 | C1c | C2c | C3c |
| Water-based black ink | K1 | K2 | K3 | K1 | K1c | K2c | K1 | K1 | K1 |
| White streak-like uneven portion (banding) | AA | AA | AA | AA | AA | C | C | AA | AA |
| Granularity | AA | AA | A | AA | AA | AA | AA | C | AA |
| Optical density (OD value) | AA | A | AA | AA | C | AA | AA | AA | AA |
| Color difference (ΔE) | AA | AA | AA | A | AA | AA | AA | AA | C | weight, the water-based magenta ink having a hue angle of 340° to 360° or 0° to 5°;

a water-based cyan ink containing water and a cyan dye having a blending amount in an entire amount of the water-based cyan ink of 2 to 3% by weight, the water-based cyan ink having a hue angle of 200° to 230°; and a water-based black ink containing water and a black dye having a blending amount in an entire amount of the water-based black ink of 6 to 7.5% by weight, wherein the yellow dye consists of at least one of C.I. Direct Yellow 86 and C.I. Direct Yellow 132, the magenta dye consists of at least one of a dye represented by the following formula (1) and C.I. Acid Red 289, and the cyan dye consists of at least one of C.I. Direct Blue 199 and C.I. Direct blue 86:

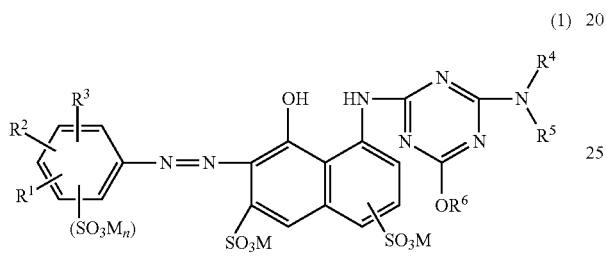

(1)

in the formula (1), n is 0, 1, or 2 each of $R^1$, $R^2$, and $R^3$ is a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, a sulfonic ester group, a substituted or non-substituted alkylsulfonyl group, a substituted or non-substituted arylsulfonyl group, a carboxy group, or a carboxylic ester group;

$R^1$, $R^2$ and $R^3$ are identical to or different from each other;

each of $R^4$, $R^5$ and $R^6$ is a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, or a substituted or non-substituted heterocyclic group;

$R^4$, $R^5$ and $R^6$ are identical to or different from each other;

when any one of $R^1$ to $R^6$ has at least one acid group, the at least one acid group is non-neutralized acid or salt thereof;

each of three Ms is H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, or $C_2H_4NH_2$; and the three Ms are identical to or different from each other.

2. The water-based ink set for ink-jet recording according to claim 1, wherein the water-based yellow ink contains C.I. Direct Yellow 86 and C.I. Direct Yellow 132.

3. The water-based ink set for ink-jet recording according to claim 2, wherein a weight ratio ($Y_{86}$:$Y_{132}$) of a blending amount ($Y_{86}$) of the C.I. Direct yellow 86 to a blending amount ($Y_{132}$) of the C.I. Direct yellow 132 in the entire amount of the water-based yellow ink is 1:4 to 3:2.

4. The water-based ink set for ink-jet recording according to claim 1, wherein the water-based yellow ink, the water-based magenta ink, the water-based cyan ink, and the water-based black ink further contain glycerol and triethylene glycol-n-butyl ether.

5. An ink-jet recording apparatus, comprising:

an ink-set accommodating section which accommodates a water-based ink set for ink-jet recording comprising:

a water-based yellow ink containing water and a yellow dye having a blending amount in an entire amount of the water-based yellow ink of 2 to 3% by weight, the water-based yellow ink having a hue angle of 45° to 65°;

a water-based magenta ink containing water and a magenta dye having a blending amount in an entire amount of the water-based magenta ink of 2 to 3% by weight, the water-based magenta ink having a hue angle of 340° to 360° or 0° to 5°;

a water-based cyan ink containing water and a cyan dye having a blending amount in an entire amount of the water-based cyan ink of 2 to 3% by weight, the water-based cyan ink having a hue angle of 200° to 230°; and a water-based black ink containing water and a black dye having a blending amount in an entire amount of the water-based black ink of 6 to 7.5% by weight;

an ink-jet head configured to jet the water-based yellow ink, the water-based magenta ink, the water-based cyan ink and the water-based black ink for the water-based ink set; and a controller, wherein in a case of recording using an achromatic color, the controller is configured to:

control the ink-jet head to jet the water-based yellow ink, the water-based magenta ink, and the water-based cyan ink in a case that all pixel values R, G, and B of the achromatic color in an RGB color space are equal to or more than a first predefined value, control the ink-jet head to jet the water-based yellow ink, the water-based magenta ink, the water-based cyan ink, and the water-based black ink in a case that all the pixel values R, G, and B of the achromatic color in the RGB color space are equal to or more than a second predefined value and less than the first predefined value, and control the ink-jet head to jet the water-based black ink in a case that all the pixel values R, G, and B of the achromatic color in the RGB color space are less than the second predefined value.

6. The ink-jet recording apparatus according to claim 5, wherein the first predefined value is in a range of 48 to 49, and the second predefined value is in a range of 0 to 1.

7. The ink-jet recording apparatus according to claim 5, wherein the yellow dye includes at least one of C.I. Direct Yellow 86 and C.I. Direct Yellow 132, the magenta dye includes at least one of a dye represented by the following formula (1) and C.I. Acid Red 289, and the cyan dye includes at least one of C.I. Direct Blue 199 and C.I. Direct blue 86:

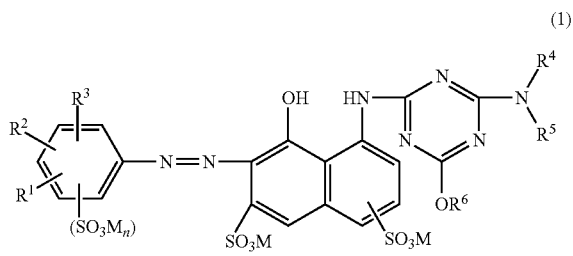

(1)

in the formula (1), n is 0, 1, or 2 each of $R^1$, $R^2$, and $R^3$ is a substituted or non-substituted alkyl group, a substituted or non-substituted alkoxy group, a halogen atom, a hydrogen atom, a hydroxyl group, a substituted or non-substituted carbamoyl group, a substituted or non-substituted sulfamoyl group, a substituted or non-substituted amino group, a nitro group, a sulfonic ester group, a substituted or non-substituted alkyl sulfonyl group, a substituted or non-substituted aryl sulfonyl group, a carboxy group, or a carboxylic ester group;

$R^1$, $R^2$ and $R^3$ are identical to or different from each other;

each of $R^4$, $R^5$ and $R^6$ is a hydrogen atom, a substituted or non-substituted alkyl group, a substituted or non-substituted alkenyl group, a substituted or non-substituted aryl group, a substituted or non-substituted aralkyl group, a substituted or non-substituted alicyclic group, or a substituted or non-substituted heterocyclic group;

$R^4$, $R^5$ and $R^6$ are identical to or different from each other;

when any one of $R^1$ to $R^6$ has at least one acid group, the at least one acid group is non-neutralized acid or salt thereof;

each of three Ms is H, Li, Na, K, $NH_4$, $NH_3CH_3$, $N(CH_3)_4$, $NH_3C_2H_5$, $N(C_2H_5)_4$, $NH_2(C_2H_4OH)_2$, $NH_3(C_2H_4NH)_5$, or $C_2H_4NH_2$; and the three Ms are identical to or different from each other.

8. The ink-jet recording apparatus according to claim 5, wherein the water-based yellow ink contains C.I. Direct Yellow 86 and C.I. Direct Yellow 132.

9. The ink-jet recording apparatus according to claim 8, wherein a weight ratio ($Y_{86}$:$Y_{132}$) of a blending amount ($Y_{86}$) of the C.I. Direct yellow 86 to a blending amount ($Y_{132}$) of the C.I. Direct yellow 132 in the entire amount of the water-based yellow ink is 1:4 to 3:2.

10. The ink-jet recording apparatus according to claim 5, wherein the water-based yellow ink, the water-based magenta ink, the water-based cyan ink, and the water-based black ink further contain glycerol and triethylene glycol-n-butyl ether.

* * * * *